(12) United States Patent
Pao et al.

(10) Patent No.: US 11,197,179 B2
(45) Date of Patent: Dec. 7, 2021

(54) DEVICE AND METHOD FOR HANDLING RADIO LINK MONITORING AND BANDWIDTH PART SWITCHING

(71) Applicant: ACER INCORPORATED, New Taipei (TW)

(72) Inventors: Wei-Chen Pao, New Taipei (TW); Chien-Min Lee, New Taipei (TW); Jung-Mao Lin, New Taipei (TW)

(73) Assignee: Acer Incorporated, New Taipei (TW)

( * ) Notice: Subject to any disclaimer, the term of this patent is extended or adjusted under 35 U.S.C. 154(b) by 8 days.

(21) Appl. No.: 16/362,687

(22) Filed: Mar. 24, 2019

(65) Prior Publication Data

US 2019/0297514 A1 Sep. 26, 2019

Related U.S. Application Data

(60) Provisional application No. 62/647,873, filed on Mar. 26, 2018.

(51) Int. Cl.
| | |
|---|---|
| *H04W 24/08* | (2009.01) |
| *H04W 72/04* | (2009.01) |
| *H04L 5/00* | (2006.01) |
| *H04W 76/19* | (2018.01) |
| *H04W 36/00* | (2009.01) |
| *H04W 36/06* | (2009.01) |
| *H04W 52/00* | (2009.01) |
| *H04W 24/04* | (2009.01) |

(52) U.S. Cl.
CPC .............. *H04W 24/08* (2013.01); *H04L 5/006* (2013.01); *H04L 5/0012* (2013.01); *H04L 5/0091* (2013.01); *H04W 36/0055* (2013.01); *H04W 36/06* (2013.01); *H04W 52/00* (2013.01); *H04W 72/042* (2013.01); *H04W 72/0453* (2013.01); *H04W 76/19* (2018.02); *H04W 24/04* (2013.01)

(58) Field of Classification Search
None
See application file for complete search history.

(56) References Cited

U.S. PATENT DOCUMENTS

| | | | | |
|---|---|---|---|---|
| 10,477,457 | B2 * | 11/2019 | Park ...................... | H04W 48/16 |
| 2015/0085762 | A1 * | 3/2015 | Matin .................... | H04W 24/02 |
| | | | | 370/329 |
| 2015/0087313 | A1 * | 3/2015 | Kim ....................... | H04W 36/32 |
| | | | | 455/437 |

(Continued)

OTHER PUBLICATIONS

Samsung, On Bandwidth Part Operation, 3GPP TSG RAN WG1 NR 90bis, Oct. 9-13, 2017, Prague, Czech Republic, R1-1717675, XP051340860.

(Continued)

*Primary Examiner* — Lonnie V Sweet
(74) *Attorney, Agent, or Firm* — JCIPRNET (57) ABSTRACT

A communication device for handling a bandwidth part (BWP) switching comprises at least one storage device; and at least one processing circuit, coupled to the at least one storage device. The at least one storage device stores instructions, and the at least one processing circuit is configured to execute the instructions of performing the BWP switching from a first BWP to a second BWP; generating a BWP adaptation indication according to a BWP configuration; and transmitting the BWP adaptation indication.

25 Claims, 9 Drawing Sheets

(56) References Cited

U.S. PATENT DOCUMENTS

| | | | |
|---|---|---|---|
| 2016/0212752 A1* | 7/2016 | Xu | H04L 5/0053 |
| 2018/0049068 A1* | 2/2018 | Agiwal | H04W 74/0833 |
| 2020/0028545 A1* | 1/2020 | Koskela | H04B 7/0408 |
| 2020/0274678 A1* | 8/2020 | Lin | H04W 72/1257 |
| 2020/0281039 A1* | 9/2020 | Yang | H04W 16/28 |
| 2020/0374923 A1* | 11/2020 | Cheng | H04L 5/0051 |
| 2021/0067194 A1* | 3/2021 | Takeda | H04B 1/7143 |

OTHER PUBLICATIONS

Samsung, RLM signalling for BWP, 3GPP TSG-RAN WG2 NR Ad hoc 0118, Jan. 22-26, 2018, Vancouver, Canada, R2-1801491, XP051386888.

Mediatek Inc et al., RLM/RLF Considering Beam Failure Recovery, 3GPP TSG-RAN WG2 Meeting AH-1801, Vancouver, Canada, Jan. 22-26, 2018, R2-1800646 (Revision of R2-1710881), XP051386270.

Ericsson, BWP impact to RLM configuration (E396), 3GPP TSG-RAN WG2 #101, Athens, Greece, Feb. 26-Mar. 2, 2018, p. 1/4-4/4, R2-1802780, XP051400786.

Ericsson, BWP and RLM in NR, 3GPP TSG-RAN WG2 NR AH#3, Vancouver, Canada, Jan. 22-26, 2018, p. 1/4-4/4, R2-1800593, XP051386243.

Spreadtrum Communications, Discussions on the IS and OOS counting procedure, 3GPP TSG-RAN WG2 Meeting #101, Athens, Greece, Feb. 26-Mar. 2, 2018, R2-1801975, XP051399388.

* cited by examiner

|  | BWP1 | BWP2 | BWP3 |
|---|---|---|---|
| BWP1 | | CB=1 | CB=1 |
| BWP2 | CB=1 | | CB=1 |
| BWP3 | CB=0 | CB=1 | |

DEVICE AND METHOD FOR HANDLING RADIO LINK MONITORING AND BANDWIDTH PART SWITCHING

CROSS REFERENCE TO RELATED APPLICATIONS

This application claims the benefit of U.S. Provisional Application No. 62/647,873 filed on Mar. 26, 2018, which is incorporated herein by reference.

BACKGROUND OF THE INVENTION

1. Field of the Invention

The present invention relates to a device and a method used in a wireless communication system, and more particularly, to a device and a method of handling a radio link monitoring and a bandwidth part switching.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc. For a UE and an eNB to communicate with each other in the LTE-A system, the UE and the eNB must support standards developed for the LTE-A system, such as the 3GPP Rel-1x standard or later versions.

A bandwidth part (BWP) switching may happen, when a UE is performing a radio link monitoring (RLM). Operations related to the RLM such as a reporting of sync indication(s), a radio problem detection and a radio problem recovery are interrupted. The UE does know how to proceed these operations when the BWP switching happens. The UE and the eNB cannot communicate with each other regularly if an effect caused by the BWP switching to the operations is not resolved.

SUMMARY OF THE INVENTION

The present invention therefore provides a device and method for handling a radio link monitoring and a bandwidth part switching to solve the abovementioned problem.

A communication device for handling a bandwidth part (BWP) switching comprises at least one storage device; and at least one processing circuit, coupled to the at least one storage device. The at least one storage device stores instructions, and the at least one processing circuit is configured to execute the instructions of performing the BWP switching from a first BWP to a second BWP; generating a BWP adaptation indication according to a BWP configuration; and transmitting the BWP adaptation indication.

A communication device for handling a radio link monitoring (RLM) comprises at least one storage device; and at least one processing circuit, coupled to the at least one storage device. The at least one storage device stores instructions, and the at least one processing circuit is configured to execute the instructions of counting a number of at least one successive sync indication, when performing the RLM; stopping counting the number of the at least one successive sync indication, when the number of the at least one successive sync indication is equal to or greater than a threshold value; and continuing counting the number of the at least one successive sync indication, when the number of the at least one successive sync indication is smaller than the threshold value.

A communication device for handling a radio link monitoring (RLM) comprises at least one storage device; and at least one processing circuit, coupled to the at least one storage device. The at least one storage device stores instructions, and the at least one processing circuit is configured to execute the instructions of counting a number of at least one successive sync indication; performing a bandwidth part switching (BWP) switching from a first BWP to a second BWP; starting or restarting a timer, when performing the BWP switching or when receiving a sync indication; and determining whether to continue counting the number of the at least one successive sync indication after the BWP switching according to the timer.

A communication device for handling a radio link monitoring (RLM) comprises at least one storage device; and at least one processing circuit, coupled to the at least one storage device. The at least one storage device stores instructions, and the at least one processing circuit is configured to execute the instructions of starting a first timer for a radio problem recovery; starting or restarting a second timer for the radio problem recovery; and determining that a radio link failure occurs according to at least one of an expiry of the first timer and an expiry of the second timer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
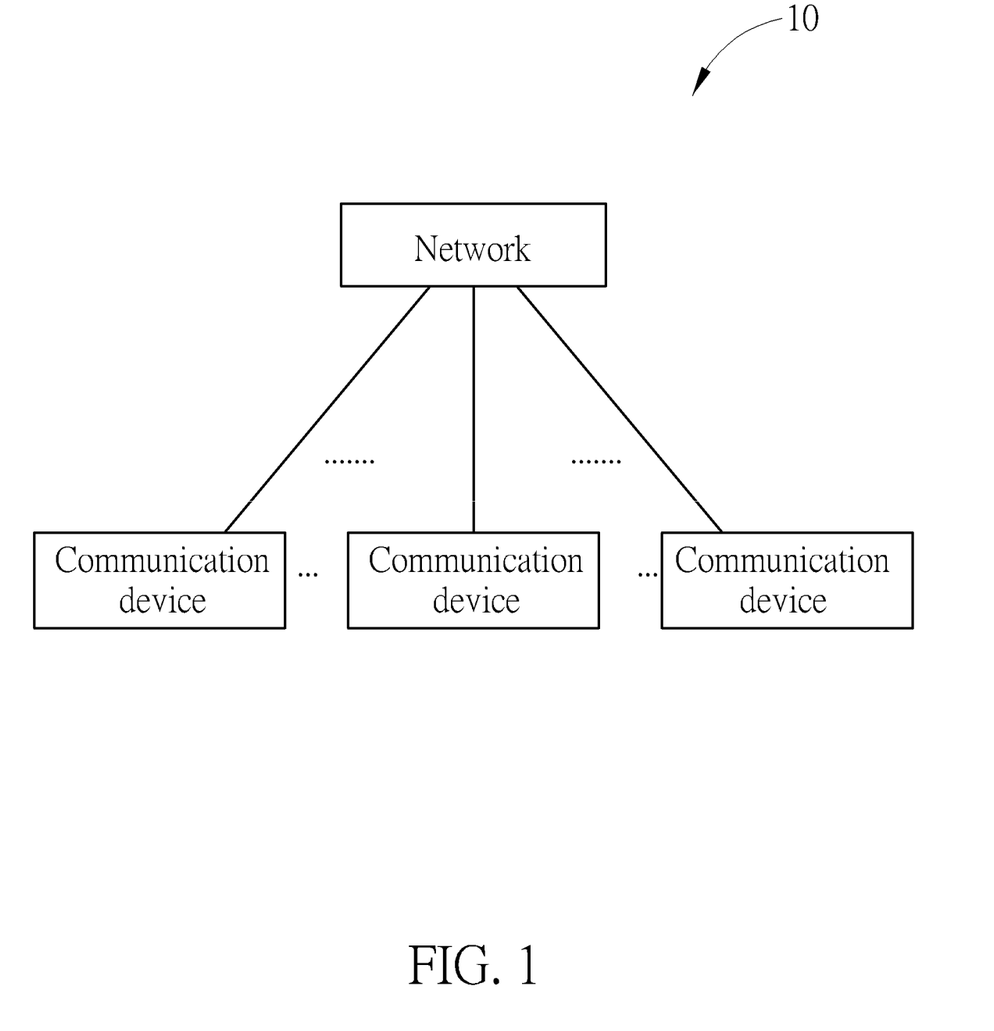
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode or a licensed-assisted access (LAA) mode. That is, the network and a communication device may communicate with each other via FDD carrier(s), TDD carrier(s), licensed carrier(s) (licensed serving cell(s)) and/or unlicensed carrier(s) (unlicensed serving cell(s)). In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In one example, the network may be an evolved UTRAN (E-UTRAN) including at least one evolved NB (eNB) and/or at least one relay node in a long term evolution (LTE) system, a LTE-Advanced (LTE-A) system, an evolution of the LTE-A system, etc. In one example, the network may be a next generation radio access network (NG-RAN) including at least one next generation Node-B (gNB) and/or at least one fifth generation (5G) base station (BS).

A NR is a standard defined for a 5G system (or 5G network) to provide a unified air interface with better performance. gNBs are deployed to realize the 5G system, which supports advanced features such as enhanced Mobile Broadband (eMBB), Ultra Reliable Low Latency Communications (URLLC), massive Machine Type Communications (mMTC), etc. The eMBB provides broadband services with a greater bandwidth and a low/moderate latency. The URLLC provides applications (e.g., end-to-end communication) with properties of a higher security and a low latency. The examples of the applications include an industrial internet, smart grids, infrastructure protection, remote surgery and an intelligent transportation system (ITS). The mMTC is able to support internet-of-things (IoT) of the 5G system which mat billions of connected devices and/or sensors.

Furthermore, the network may also include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In one example, after the network receives information transmitted by a communication device, the information may be processed only by the UTRAN/E-UTRAN/NG-RAN and decisions corresponding to the information are made at the UTRAN/E-UTRAN/NG-RAN. In one example, the UTRAN/E-UTRAN/NG-RAN may forward the information to the core network, and the decisions corresponding to the information are made at the core network after the core network processes the information. In one example, the information may be processed by both the UTRAN/E-UTRAN/NG-RAN and the core network, and the decisions are made after coordination and/or cooperation are performed by the UTRAN/E-UTRAN/NG-RAN and the core network.

A communication device may be a user equipment (UE), a low cost device (e.g., machine type communication (MTC) device), a device-to-device (D2D) communication device, a narrow-band internet of things (IoT) (NB-IoT), a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
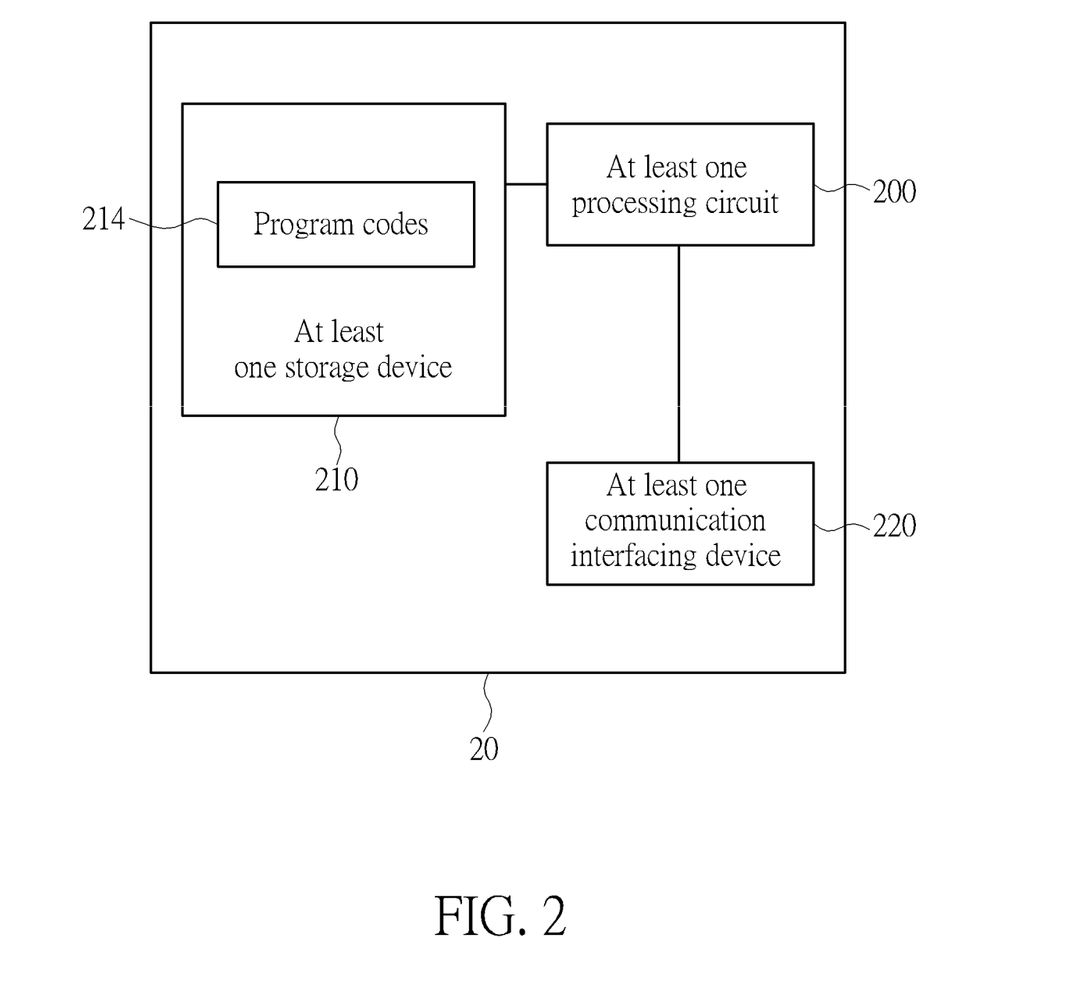
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

Figure 3:
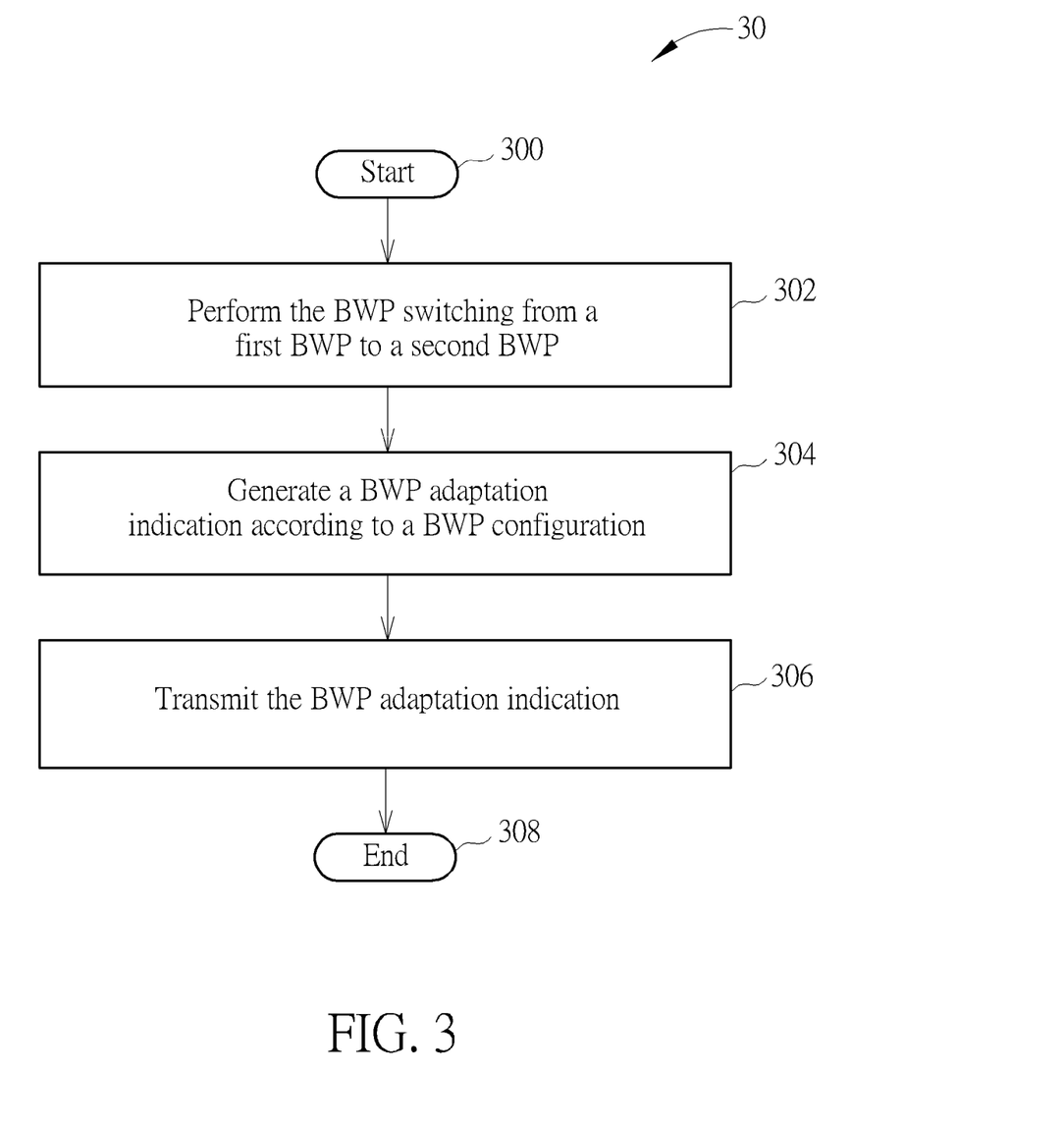
FIG. 3 is a flowchart of a process according to an example of the present invention.

FIG. 3 is a flowchart of a process 30 according to an example of the present invention. The process 30 may be utilized in a communication device, to handle a bandwidth part (BWP) switching. The process 30 may be compiled into the program codes 214 and includes the following steps:

Step 300: Start.

Step 302: Perform the BWP switching from a first BWP to a second BWP.

Step 304: Generate a BWP adaptation indication according to a BWP configuration.

Step 306: Transmit the BWP adaptation indication.

Step 308: End.

According to the process 30, the communication device performs the BWP switching from a first BWP to a second BWP. The communication device generates a BWP adaptation indication (e.g., at a physical layer of the communication device) according to a BWP configuration. Then, the communication device transmits the BWP adaptation indication (e.g., from the physical layer to a higher layer of the communication device). That is, the BWP adaptation indication provides information related to the BWP switching, for the higher layer to perform corresponding operations.

Thus, the communication device can operate properly without being affected by the BWP switching.

Realization of the process 30 is not limited to the above description. The following examples may be applied for realizing the process 30.

In one example, the BWP adaptation indication indicates the higher layer to stop or continue counting (e.g., accumulating) at least one successive sync indication. In one example, the at least one successive sync indication includes at least one successive in-sync indication or at least one successive out-of-sync indication for a radio link monitoring (RLM). In one example, the at least one successive sync indication includes at least one successive beam failure indication for a beam failure detection. In one example, the BWP adaptation indication indicates the higher layer to stop counting the at least one successive sync indication and to stop a timer (e.g., T310, T312 or T314) if a distance between the first BWP and the second BWP (e.g., a distance between central frequencies of the BWPs) is greater than a threshold value (e.g., out of a coherence bandwidth or a coherence time), or indicates the higher layer to continue counting the at least one sync indication if the distance between the first BWP and the second BWP is not greater than the threshold value.

In one example, when a DL radio link quality estimated over a last 200 ms period becomes worse than a threshold $Q_{out}$, Layer 1 (e.g., physical layer) of the communication device may send an out-of-sync indication to a higher layer within a 200 ms $Q_{out}$ evaluation period. In one example, when the DL radio link quality estimated over the last 100 ms period becomes better than a threshold $Q_{in}$, Layer 1 of the communication device may send an in-sync indication to the higher layer within a 100 ms $Q_{in}$ evaluation period. In one example, two successive indications from Layer 1 are separated by at least 10 ms.

In one example, an out-of-sync indication after a beam recovery indication may be associated with a reference signal (e.g., a beam), and successive indications may be calculated according to one reference signal or multiple reference signals.

In one example, a radio resource control (RRC) layer or another layer for counting a number of in-sync indications or a number of out-of-sync indications may be informed about the BWP switching or a change of a reference signal for the RLM. The BWP adaptation indication may be further coupled with the above example. For example, a physical layer may send an indication (e.g., the BWP adaptation) to a RRC layer for handling of an in-sync indication or an out-of-sync indication in a RLF detection algorithm, which may be preconfigured by a network (e.g., gNB), according to, e.g., a coherence time, a coherence bandwidth, a mobility speed, a service type, etc. In one example, the BWP adaptation indication may also be triggered upon a beam switching, a change of a reference signal for a RLM evaluation or a RLF detection, an autonomous switch by the communication device (e.g., for concerned resource, a random access (RA) channel (RACH) resource, a RA response (RAR), system information, etc.), a beam (recovery) failure, etc.

In one example, the BWP switching may be performed due to a timer expiry, such that a default behavior may be configured or determined, e.g., to reset a timer (e.g., T310) and/or the number of successive indications, to fall back to a normal operation, etc.

In one example, a physical layer may send a fake indication, such that a layer for counting an in-sync indication or an out-of-sync indication may be not aware of the BWP switching. In a stage of a radio problem detection, for a case to discard the number of out-of-sync indications, the PHY layer may send an in-sync indication upon the BWP adaptation. The RLM procedure may fall back to a normal operation. In the stage of the timer T310, for a case to stop the timer T310, the physical layer may send a set of successive in-sync indications upon the BWP adaptation. The RLM procedure may fall back to the normal operation. In one example, the physical layer may handle threshold(s) and/or timer(s) for the RLM procedure. For example, the physical layer may send a signalling or a flag to a higher layer (e.g., medium access control (MAC) layer or RRC layer) upon a RLF declaration or a beam (recovery) failure. For example, the physical layer may handle a RLF detection algorithm.

In one example, a network (e.g., gNB) may indicate the communication device whether or not to perform a RLM evaluation during a transition of the BWP switching, when there is no reference signal for the RLM evaluation for a BWP, etc. In one example, the RLM evaluation (e.g., estimation window/period) for different BWPs may be separate or joint.

In one example, the BWP configuration is received from a network. In one example, the BWP configuration is received in a DL control information or a RRC message.

In one example, the BWP configuration includes a relation information between the first BWP and the second BWP. In one example, the relation information includes at least one of a distance between the first BWP and the second BWP. In one example, includes a bandwidth difference between the first BWP and the second BWP. Contents of the relation information are various, and are not limited herein. Examples of the contents are illustrated as follows. In one example, the first BWP and the second BWP may be non-overlapped (e.g., when locations (or frequency ranges) of the BWPs are below 6 GHz), partially overlapped or fully overlapped. In one example, the first BWP and the second BWP are provided by (e.g., served via) different beams. In one example, numerologies of the first BWP and the second BWP are different. In one example, service requirements, service types, central frequencies, deployment scenarios, loading situations, bandwidths of the first BWP and the second BWP are different.

In one example, the higher layer is a RRC layer or a MAC layer. In one example, the communication device is in a RRC_CONNECTED state.

In one example, the BWP switching is performed according to one of following events: a load balancing, a power saving, a service switching, a radio problem detection, a timer expiration, a reception of a DCI and a reception of a RRC signaling. That is, the BWP switching may be triggered by any of the above events. In one example, the communication device performs the BWP switching from the first BWP to the second BWP, when performing a RLM. In one example, the communication device generates the BWP adaptation indication (e.g., for a RLM at the physical layer of the communication device) according to the BWP configuration, when performing the BWP switching.

The present invention may be applied to a scenario of multiple active BWPs per cell of the communication device or multiple active BWPs among cells of the communication device. In one example, a network (e.g., gNB) may configure at least one BWP or at least one cell associated with the RLM evaluation, or the communication device may be aware of the RLM evaluation associated with at least one BWP or at least one cell. In one example, the communication device may perform a communication with a network (e.g., gNB) via multiple active BWPs of a cell, e.g., a primary cell with BWPs BWP1, BWP2 and BWP3. For example, the BWP BWP1 may be denoted as a primary BWP via a gNB configuration (e.g., explicitly indication), a BWP number or a BWP identity (e.g., lowest or highest), etc., which may declare a RLF upon a recovery failure (e.g., T310 expiry). For example, some or all BWPs of a cell may be grouped as a primary set of BWPs via a gNB configuration for the RLM evaluation, which may declare a RLF. In one example, a detection of indications, e.g., an out-of-sync indication, an in-sync indications, a beam failure instance, or a non-beam failure instance, may be counted in any layer, e.g., physical layer, MAC layer, or RRC layer.

Figure 4:
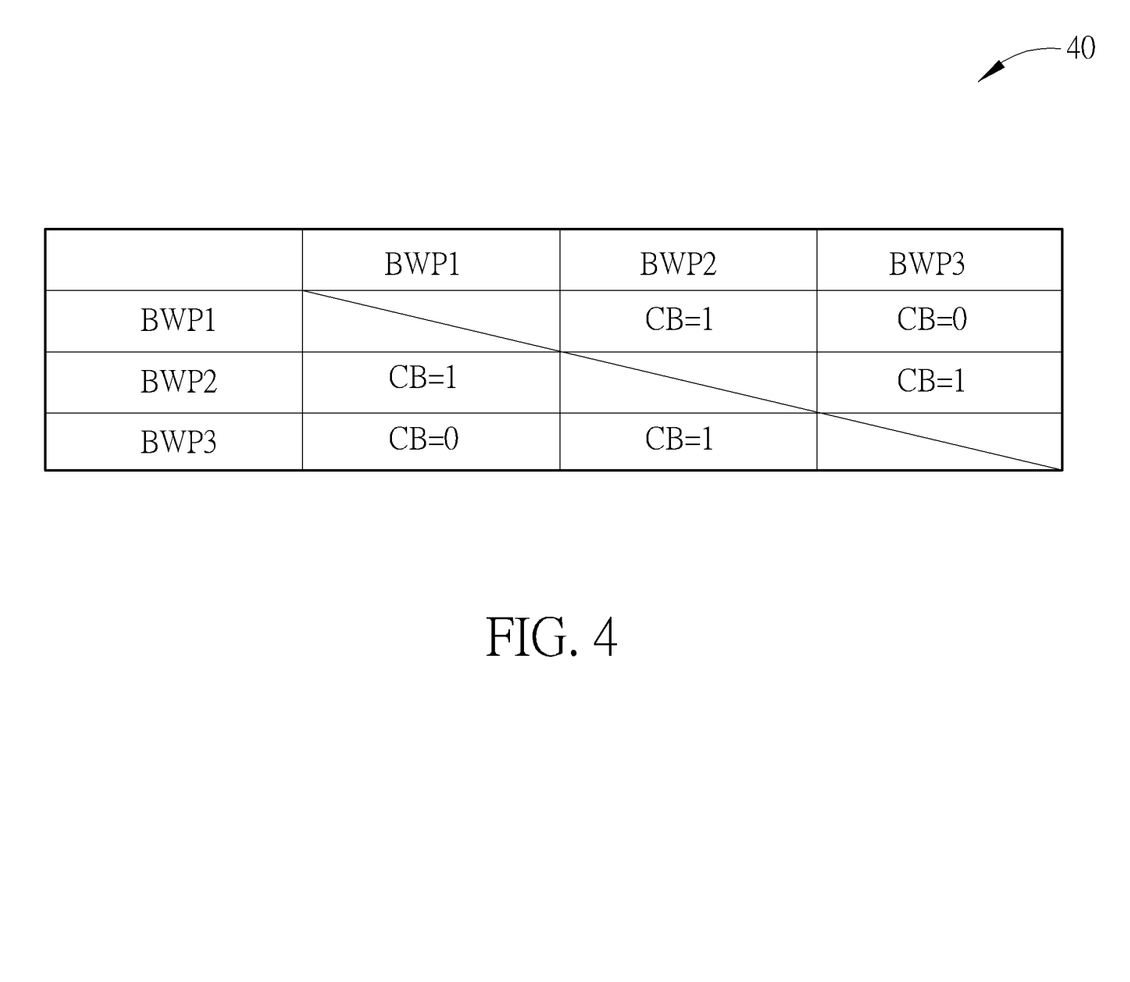
FIG. 4 is a relation table according to an example of the present invention.

FIG. 4 is a relation table 40 according to an example of the present invention. There are 3 BWPs BWP1-BWP3 in the table 40. Relations (e.g., correlations) between the BWPs BWP1-BWP3 may be different, and are indicated by a bit CB={0, 1}. The bit CB may be included in the BWP configuration, and is transmitted from the physical layer to the higher layer. For example, CB=0 indicates that a distance between the BWPs BWP1 and BWP3 is large, e.g., outside a coherent bandwidth. For example, CB=1 indicates that a distance between the BWPs BWP1 and BWP2 and a distance between the BWPs BWP2 and BWP3 are not large, e.g., inside the coherent bandwidth. In this case, the BWPs may be partly overlapped, or is close to each other. For example, CB=0 indicates that counting of at least one successive sync indication is stopped. For example, CB=1 indicates that the counting is continued.

In one example, in addition to a frequency range between two BWPs, a network (e.g., gNB) may consider more factors to determine a value of CB for a pair of BWPs, additional information or a counting behavior, and the factors may include a service requirement, a service type, a central frequency, a deployment scenario, a loading situation, a bandwidth, etc.

Figure 5:
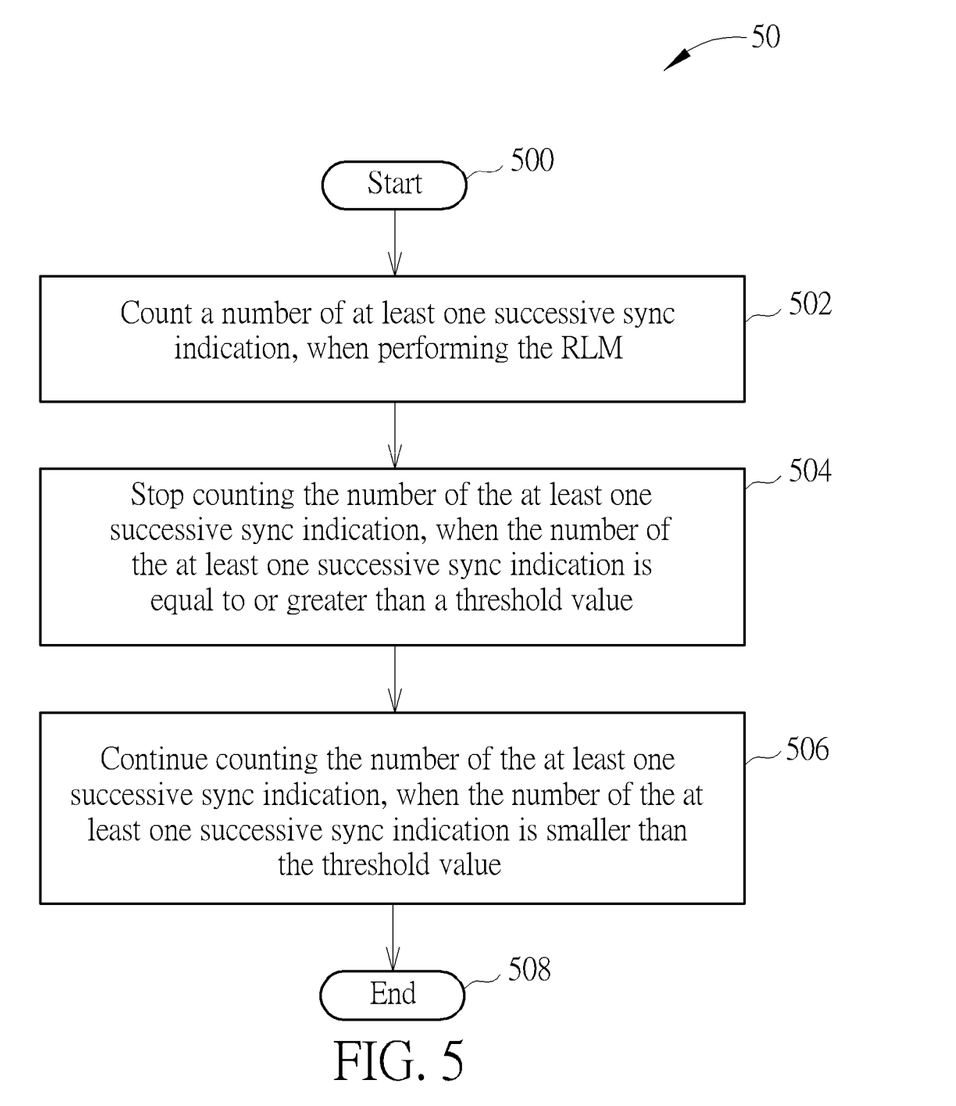
FIG. 5 is a flowchart of a process according to an example of the present invention.

FIG. 5 is a flowchart of a process 50 according to an example of the present invention. The process 50 may be utilized in a communication device, to handle a RLM. The process 50 may be compiled into the program codes 214 and includes the following steps:

Step 500: Start.

Step 502: Count a number of at least one successive sync indication, when performing the RLM.

Step 504: Stop counting the number of the at least one successive sync indication, when the number of the at least one successive sync indication is equal to or greater than a threshold value.

Step 506: Continue counting the number of the at least one successive sync indication, when the number of the at least one successive sync indication is smaller than the threshold value.

Step 508: End.

According to the process 50, the communication device counts (e.g., accumulates) a number of at least one successive sync indication, when performing a RLM. The communication device stops counting the number of the at least one successive sync indication, when the number of the at least one successive sync indication is equal to or greater than a threshold value. The communication device continues counting the number of the at least one successive sync indication, when the number of the at least one successive sync indication is smaller than the threshold value. That is, whether the counting is continued is based on the number of the at least one successive sync indication. In one example, once one in-sync indication is sent during a radio problem detection, the number of successive out-of-sync indications may be reset. Thus, the communication device can operate properly without being affected by the BWP switching.

Realization of the process 50 is not limited to the above description. The following examples may be applied for realizing the process 50.

In one example, the communication device starts a timer (e.g., related to the RLM), when the number of the at least one successive sync indication is equal to or greater than the threshold value, when initiating a beam failure recovery procedure, or when initiating a RA procedure. In one example, the timer is a recovery timer, e.g., for a beam failure recovery. In one example, the communication device performs a BWP switching from a first BWP to a second BWP. In one example, the communication device generates a BWP adaptation indication according to a BWP configuration, when performing the BWP switching. In one example, the threshold value is configured by a higher layer message, is configured by a RRC message, or is a fixed value. In one example, the threshold value is communication device-specific (i.e., UE-specific), BWP-specific or cell-specific. In one example, the communication device starts (or restarts) a detection timer, when receiving a sync indication.

The present invention may be applied to a scenario of a beam failure detection. For example, examples for handling a radio problem detection during the BWP switching and for handling a radio problem recovery during the BWP switching, may be applied after a beam recovery failure indication is sent. The beam recovery failure indication may be sent, when a beam failure recovery may be considered unsuccessful or failure. For example, a behavior of handling an in-sync indication or an out-of-sync indication, e.g., accumulate or discard the number of indications in various stages of a RLM procedure may be applied to the beam failure detection. The communication device may be further indicated whether or not to stop a timer (e.g., T310, T312 or T314), if the timer is running. A corresponding parameter configuration to extend or to shorten the RLM process may include that an in-sync indication may include a beam failure instance and/or that an out-of-sync indication may include a non-beam failure instance.

In one example, the beam failure recovery procedure may include a timer, e.g., Beam-failure-recovery-Timer, which may start upon a beam failure detection event declared by the communication device, e.g., all or partial serving beams fail and may stop upon a reception of a response from a network (e.g., gNB) for a beam failure recovery request transmission. In one example, the beam failure recovery procedure may include a beam failure recovery which may be considered unsuccessful or failed when one of the following conditions is satisfied: (a) upon an expiry of a beam failure recovery timer, e.g., Beam-failure-recovery-Timer, and (b) upon reaching a maximum number of beam failure recovery query transmissions. In one example, the beam failure recovery procedure may include a beam recovery failure indication which may be sent upon an unsuccessful beam failure recovery. An event may be triggered upon an unsuccessful beam failure recovery. A beam recovery failure indication may be sent during a procedure of a radio link monitoring.

In one example, when the case that the number of the at least one successive sync indication (e.g., out-of-sync indication, beam failure indication) is equal to or greater than the threshold value happens or when the case that the number of the at least one successive sync indication (e.g., in-sync indication) is smaller than the threshold value happens (e.g., radio link failure or beam failure), the communication device initiates (e.g., performs) a RA procedure (e.g., for a RRC connection establishment or a RRC connection reestablishment) with a network. Further, the communication device may select a DL BWP from a plurality BWPs (e.g., of a serving cell or a primary cell), and may transmit at least one of a BWP identity of the DL BWP, a signal quality of the DL BWP and an identity of the communication device to the network during the RA procedure. The signal quality may include a reference signal received power (RSRP), a reference signal received quality (RSRQ) and/or a signal to noise and interference ratio (SINR), and is not limited herein. In one example, the plurality BWPs are configured with a plurality of BWP identities, respectively. In one example, the plurality BWPs are configured with a plurality of reference signals (e.g., channel state information-reference signal (CSI-RS), synchronization signal block (SSB)), respectively. In one example, the plurality BWPs are configured with a plurality of physical RA channel (PRACH) resources, respectively. In one example, the plurality BWPs comprises at least one of an initial BWP, a default BWP and a BWP supporting the BWP switching. In one example, the at least one of the BWP identity of the DL BWP, the signal quality of the DL BWP and the identity of the communication device is transmitted in the RA procedure (e.g., msg3).

In one example, the at least one successive sync indication includes at least one successive in-sync indication or at least one successive out-of-sync indication for a RLM. In one example, the at least one successive sync indication includes at least one successive beam failure indication for a beam failure detection.

Figure 6:
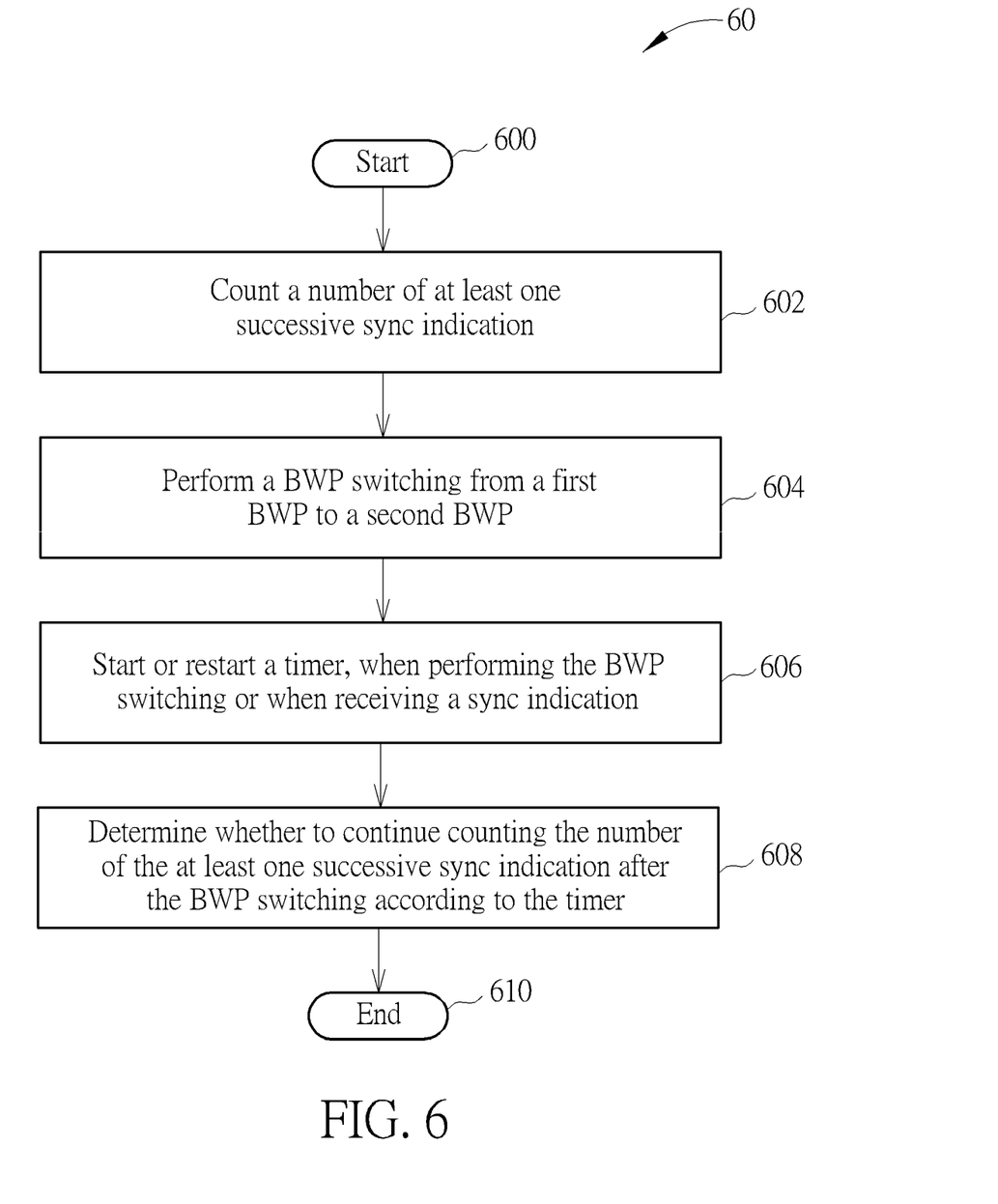
FIG. 6 is a flowchart of a process according to an example of the present invention.

FIG. 6 is a flowchart of a process 60 according to an example of the present invention. The process 60 may be utilized in a communication device, to handle a RLM. The process 60 may be compiled into the program codes 214 and includes the following steps:

Step 600: Start.

Step 602: Count a number of at least one successive sync indication.

Step 604: Perform a BWP switching from a first BWP to a second BWP.

Step 606: Start or restart a timer, when performing the BWP switching or when receiving a sync indication.

Step 608: Determine whether to continue counting the number of the at least one successive sync indication after the BWP switching according to the timer.

Step 610: End.

According to the process 60, the communication device counts a number of at least one successive sync indication (e.g., when performing the RLM). The communication device performs a BWP switching from a first BWP to a second BWP. The communication device starts (or restarts) a timer (e.g., T310 or a new timer), when performing the BWP switching or when receiving a sync (e.g., in-sync) indication. Then, the communication device determines whether to continue counting the number of the at least one successive sync indication after the BWP switching according to the timer. That is, the number of the at least one successive sync indication are processed based on the timer. Thus, the communication device can operate properly without being affected by the BWP switching.

Realization of the process 60 is not limited to the above description. The following examples may be applied for realizing the process 60.

In one example, the instruction of determining whether to continue counting the number of at least one successive sync indication after the BWP switching according to the timer comprises continuing counting the number of the at least one successive sync indication after the BWP switching, if a sync indication is received after the BWP switching before the timer expires, and comprises discarding the number of the at least one successive sync indication after the BWP switching (and may further comprise going back to a normal operation), if no sync indication is received after the BWP switching before the timer expires. In one example, the at least one successive sync indication comprises at least one successive in-sync indication or at least one successive out-of-sync indication (e.g., for the RLM).

In one example, the timer is a new timer, e.g., timer T_OOS. In one example, the timer is communication device-specific (i.e., UE-specific), BWP-specific or cell-specific. The timer may start after the BWP switching or may restart once out-of-sync indication is sent, and the timer may be pre-determined or configured by a network (e.g., gNB). In one example, the number of the at least one successive sync indication is communication device-specific (i.e., UE-specific), BWP-specific or cell-specific.

Figure 7:
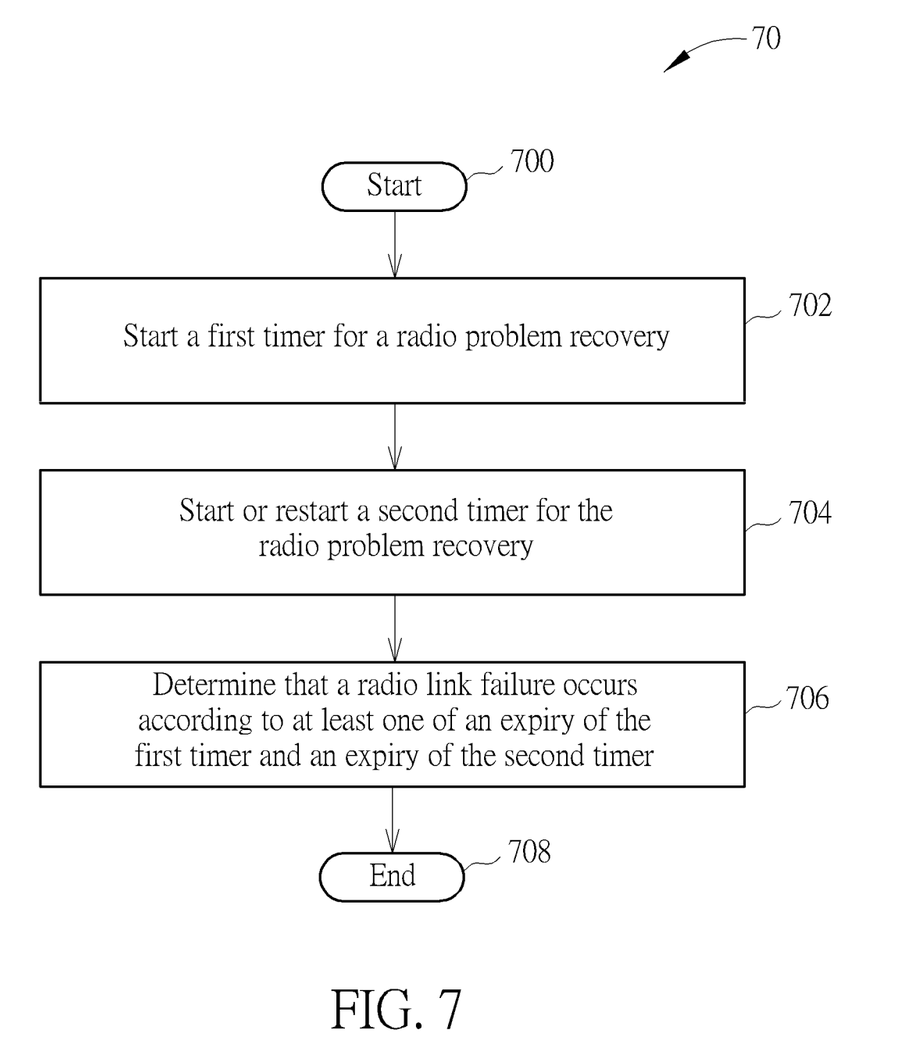
FIG. 7 is a flowchart of a process according to an example of the present invention.

FIG. 7 is a flowchart of a process 70 according to an example of the present invention. The process 70 may be utilized in a communication device, to handle a RLM. The process 70 may be compiled into the program codes 214 and includes the following steps:

Step 700: Start.

Step 702: Start a first timer for a radio problem recovery.

Step 704: Start or restart a second timer for the radio problem recovery.

Step 706: Determine that a radio link failure occurs according to at least one of an expiry of the first timer and an expiry of the second timer.

Step 708: End.

According to the process 70, the communication device starts a first timer (e.g., T310) for a radio problem recovery. The communication device starts (or restarts) a second timer (e.g., a new timer) for the radio problem recovery. Then, the communication device determines (e.g., declares) that a radio link failure occurs according to at least one of an expiry of the first timer and an expiry of the second timer. That is, whether the radio link failure occurs may be determined based on an addition timer. Thus, the communication device can operate properly without being affected by the BWP switching.

Realization of the process 70 is not limited to the above description. The following examples may be applied for realizing the process 70.

In one example, the instruction of determining that the radio link failure occurs according to the at least one of the expiry of the first timer and the expiry of the second timer comprises: determining that the radio link failure occurs, when both the first timer and the second timer expire. In one example, the instruction of determining that the radio link failure occurs according to the at least one of the expiry of the first timer and the expiry of the second timer comprises: determining that the radio link failure occurs, when one of the first timer and the second timer expires.

In one example, the communication device determines that the radio link failure occurs according to the at least one of the expiry of the first timer and the expiry of the second timer, if a number of at least one successive sync indication (e.g., in-sync indication) is smaller than a threshold value.

In one example, the communication device starts the second timer, after the first timer expires or stops. In one example, the communication device starts the second timer, before the first timer expires or stops. In one example, the first timer is configured with a first value, and the second timer is the first timer configured with a second value. That is, the same timer with different values are used for implementing the first timer and the second timer.

In one example, the communication device performs a BWP switching from a first BWP to a second BWP before the first timer expires. In one example, the communication device starts the second timer, when performing a BWP switching or when receiving a sync indication (e.g., in-sync indication). In one example, the communication device counts a number of at least one successive sync indication before starting the first timer, and determines whether to continue counting the number of the at least one successive sync indication according to the at least one of the expiry of the first timer and the expiry of the second timer. In one example, a value of the second timer is related to a number of BWP switchings performed by the communication device. For example, a greater value of the second timer is configured for a greater number of BWP switchings.

In one example, upon a timer expires and the number of consecutive in-sync indications is smaller than a threshold, the communication device may switch to other configured BWPs and may perform a corresponding RA (e.g., RACH resource) before declaring a RLF. A signaling or a flag may be sent to a MAC layer for triggering the RA. The communication device may declare the RLF (e.g., only) if a RA failure for the configured BWPs is confirmed.

In one example, the at least one successive sync indication comprises at least one successive in-sync indication or at least one successive out-of-sync indication (e.g., for the RLM).

Figure 8:
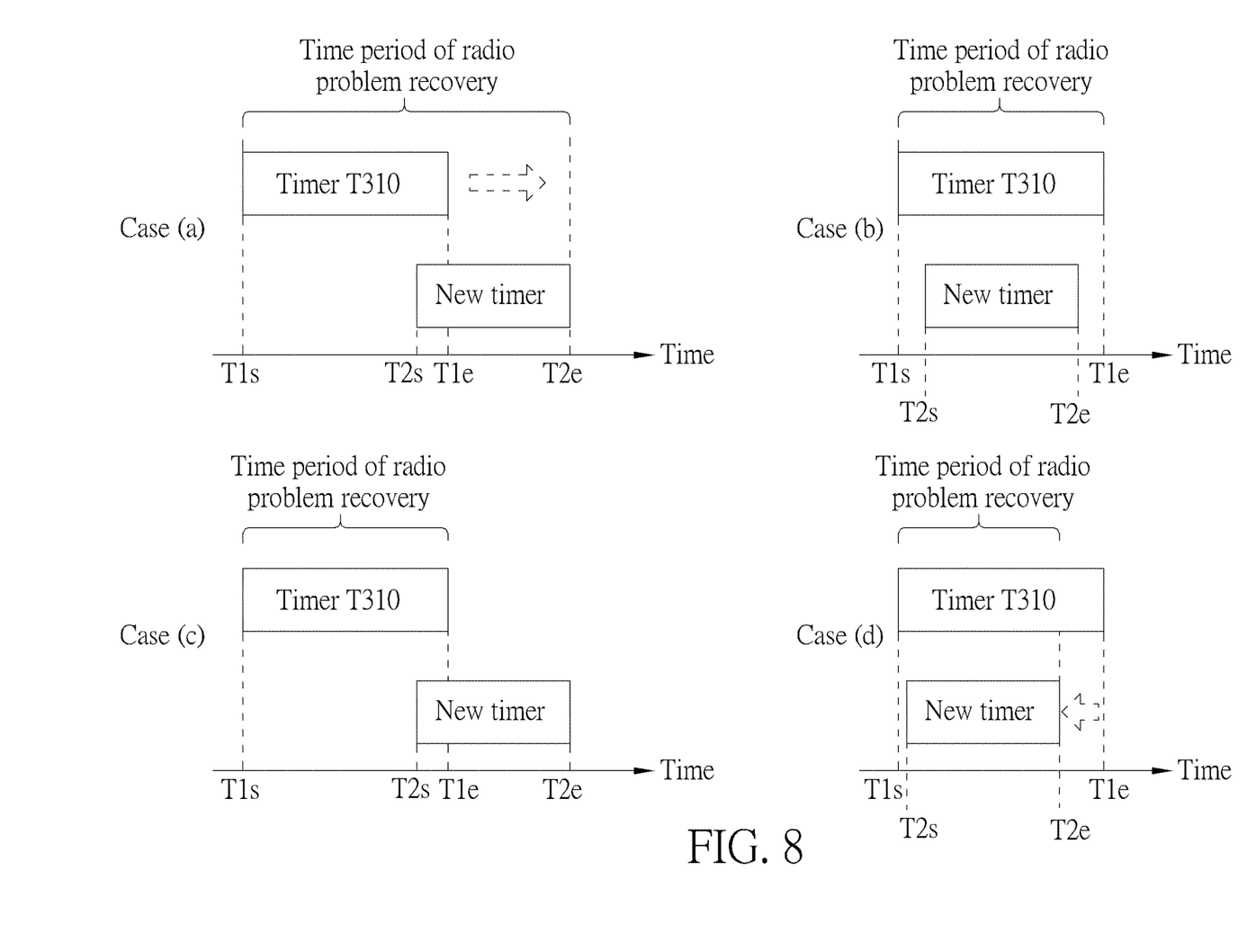
FIG. 8 is a schematic diagram of radio problem recoveries according to an example of the present invention.

FIG. 8 is a schematic diagram of radio problem recoveries according to an example of the present invention. The first timer and the second timer are a timer T310 and a new timer, respectively. There are four cases (a)-(d) for illustrating the timers with different positions and lengths. In these cases, the timer T310 and the new timer are started at times instants T1s and T2s, respectively, and expire at times instants T1e and T2e, respectively. A time period of a radio problem recovery may be affected (e.g., shortened, maintained or extended) according to the usage of the new timer. In the cases (a) and (b), the communication device determines (e.g., declares) that the radio link failure occurs, when both the timer T310 and the new timer expire. In the case (a), the time period of the radio problem recovery ends at the time instant T2e, i.e., the time period is extended. In the case (b), the time period of the radio problem recovery ends at the time instant T1e, i.e., the time period is maintained. In the cases (c) and (d), the communication device determines (e.g., declares) that the radio link failure occurs, when one of the timer T310 and the new timer expires. In the case (c), the time period of the radio problem recovery ends at the time instant T1e, i.e., the time period is maintained. In the case (d), the time period of the radio problem recovery ends at the time instant T2e, i.e., the time period is shortened. As can be seen, the new timer can be designed according to design considerations and/or system requirements, to control the time period of the radio problem recovery.

Figure 9:
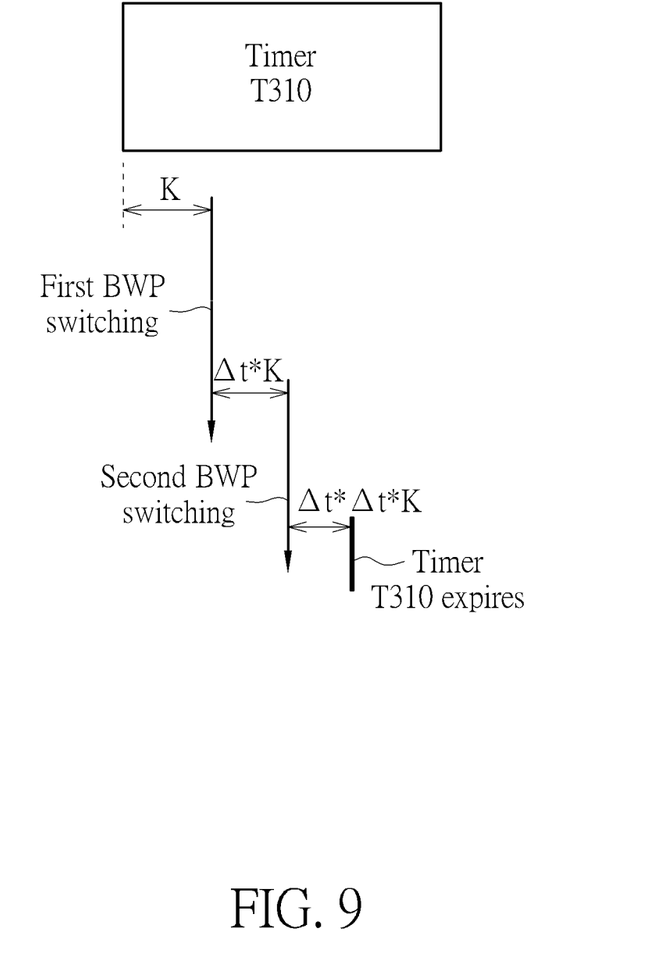
FIG. 9 is a flowchart of a process according to an example of the present invention.

FIG. 9 is a schematic diagram of reconfiguration of a timer T310 according to an example of the present invention. An offset $0<\Delta T<1$ is configured for a value K of the timer T310. When a first BWP switching occurs, the timer T310 is restarted with a value of $\Delta T*K$. That is, the value of the timer T310 is reduced, and a shorter expiry of the timer T310 is resulted. Then, a second BWP switching occurs, the timer T310 is restarted with a value of $\Delta T*\Delta T*K$, i.e., the value of the timer T310 is further reduced. Then, the timer T310 expires before a next BWP switching occurs.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module (s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a communication device and method for handling a RLM and a BWP switching. Operations to be performed by the communication device are defined. Thus, the communication device can operate properly without being affected by the BWP switching. As a result, the problem regarding the BWP switching is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a bandwidth part (BWP) switching, comprising:
   at least one storage device; and
   at least one processing circuit, coupled to the at least one storage device, wherein the at least one storage device stores instructions, and the at least one processing circuit is configured to execute the instructions of:
   performing the BWP switching from a first BWP to a second BWP;
   generating a BWP adaptation indication according to a BWP configuration; and
   transmitting the BWP adaptation indication, wherein the BWP configuration comprises a relation information between the first BWP and the second BWP, wherein the relation information comprises at least one of a distance between the first BWP and the second BWP, wherein the BWP adaptation indication indicates a higher layer to stop or continue counting at least one successive sync indication.

2. The communication device of claim 1, wherein the at least one successive sync indication comprises at least one successive in-sync indication or at least one successive out-of-sync indication for a radio link monitoring (RLM).

3. The communication device of claim 1, wherein the at least one successive sync indication comprises at least one successive beam failure indication for a beam failure detection.

4. The communication device of claim 1, wherein the higher layer is a RRC layer or a medium access control (MAC) layer.

5. The communication device of claim 1, wherein the BWP configuration is received in a downlink (DL) control information or a radio resource control (RRC) message.

6. The communication device of claim 1, wherein the BWP switching is performed according to one of following events: a load balancing, a power saving, a service switching, a radio problem detection, a timer expiration, a reception of a downlink (DL) control information (DCI) and a reception of a RRC signaling.

7. The communication device of claim 1, wherein the communication device performs the BWP switching from the first BWP to the second BWP, when performing a RLM.

8. The communication device of claim 1, wherein the communication device generates the BWP adaptation indication according to the BWP configuration, when performing the BWP switching.

9. A communication device for handling a radio link monitoring (RLM), comprising:
  at least one storage device; and
  at least one processing circuit, coupled to the at least one storage device, wherein the at least one storage device stores instructions, and the at least one processing circuit is configured to execute the instructions of:
  counting a number of at least one successive sync indication, when performing the RLM;
  stopping counting the number of the at least one successive sync indication, when the number of the at least one successive sync indication is equal to or greater than a threshold value;
  initiating a radio access (RA) procedure with a network, when the number of the at least one successive sync indication is equal to or greater than the threshold value;
  transmitting at least one of a BWP identity of a downlink (DL) BWP, a signal quality of the DL BWP and an identity of the communication device to the network, during the RA procedure;
  continuing counting the number of the at least one successive sync indication, when the number of the at least one successive sync indication is smaller than the threshold value; and
  starting a recovery timer, when the number of the at least one successive sync indication is equal to or greater than the threshold value, when initiating a beam failure recovery procedure, or when initiating a random access (RA) procedure.

10. The communication device of claim 9, wherein the instructions further comprise:
  performing a bandwidth part (BWP) switching from a first BWP to a second BWP.

11. The communication device of claim 10, wherein the communication device generates a BWP adaptation indication according to a BWP configuration, when performing the BWP switching.

12. The communication device of claim 9, wherein the threshold value is configured by a higher layer message, is configured by a radio resource control (RRC) message, or is a fixed value.

13. The communication device of claim 9, wherein the threshold value is communication device-specific, BWP-specific or cell-specific.

14. The communication device of claim 9, wherein the instructions further comprise:
  starting or restarting a detection timer, when receiving a sync indication.

15. The communication device of claim 9, wherein the instructions further comprise:
  selecting the downlink (DL) BWP from a plurality BWPs.

16. The communication device of claim 15, wherein the plurality BWPs are configured with a plurality of BWP identities, respectively.

17. The communication device of claim 15, wherein the plurality BWPs are configured with a plurality of physical RA channel (PRACH) resources, respectively.

18. A communication device for handling a radio link monitoring (RLM), comprising:
  at least one storage device; and
  at least one processing circuit, coupled to the at least one storage device, wherein the at least one storage device stores instructions, and the at least one processing circuit is configured to execute the instructions of:
  counting a number of at least one successive sync indication;
  performing a bandwidth part (BWP) switching from a first BWP to a second BWP;
  starting or restarting a timer, when performing the BWP switching or when receiving a sync indication; and
  determining whether to continue counting the number of the at least one successive sync indication after the BWP switching according to the timer.

19. The communication device of claim 18, wherein the instruction of determining whether to continue counting the number of at least one successive sync indication after the BWP switching according to the timer comprises:
  continuing counting the number of the at least one successive sync indication after the BWP switching, if a sync indication is received after the BWP switching before the timer expires; and
  discarding the number of the at least one successive sync indication after the BWP switching, if no sync indication is received after the BWP switching before the timer expires.

20. The communication device of claim 18, wherein the at least one successive sync indication comprises at least one successive in-sync indication or at least one successive out-of-sync indication.

21. A communication device for handling a radio link monitoring (RLM), comprising:
  at least one storage device; and
  at least one processing circuit, coupled to the at least one storage device, wherein the at least one storage device stores instructions, and the at least one processing circuit is configured to execute the instructions of:
  starting a first timer for a radio problem recovery;
  starting or restarting a second timer for the radio problem recovery;

determining that a radio link failure occurs according to at least one of an expiry of the first timer and an expiry of the second timer; and performing a bandwidth part (BWP) switching from a first BWP to a second BWP before the first timer expires, wherein the second timer expires before a next BWP switching occurs.

22. The communication device of claim 21, wherein the communication device determines that the radio link failure occurs according to the at least one of the expiry of the first timer and the expiry of the second timer, if a number of at least one successive in-sync indication is smaller than a threshold value.

23. The communication device of claim 21, wherein the communication device starts the second timer, after the first timer expires or stops.

24. The communication device of claim 21, wherein the communication device starts the second timer, before the first timer expires or stops.

25. The communication device of claim 21, wherein the communication device starts the second timer, when performing a BWP switching or when receiving an in-sync indication.

* * * * *